United States Patent [19]

Mitchell

[11] Patent Number: 4,836,706
[45] Date of Patent: Jun. 6, 1989

[54] QUICK CHANGE TOOL HOLDER

[75] Inventor: James L. Mitchell, Rogers, Ark.

[73] Assignee: Rogers Tool Works, Inc., Rogers, Ark.

[21] Appl. No.: 33,694

[22] Filed: Apr. 3, 1987

Related U.S. Application Data

[63] Continuation of Ser. No. 699,529, Feb. 8, 1985, Pat. No. 4,665,631.

[51] Int. Cl.⁴ .............................................. F16B 1/00
[52] U.S. Cl. ...................................... 403/24; 403/349
[58] Field of Search ...................... 403/348, 349, 24, 25

[56] References Cited

U.S. PATENT DOCUMENTS

| | | |
|---|---|---|
| 1,037,072 | 8/1912 | Snyder . |
| 1,332,898 | 3/1920 | Hossie et al. ................... 403/349 X |
| 1,856,973 | 5/1932 | Smith . |
| 2,092,060 | 9/1937 | Gairing . |
| 2,224,386 | 12/1940 | Guild . |
| 2,399,808 | 5/1946 | Jones . |
| 2,431,268 | 11/1947 | McIntyre . |
| 2,617,166 | 11/1952 | Kaufmann . |
| 2,885,232 | 5/1959 | Eberly . |
| 2,953,403 | 9/1960 | Garey . |
| 3,168,322 | 2/1965 | Dziedzic . |
| 3,171,666 | 3/1965 | Benjamin et al. . |
| 3,190,377 | 6/1965 | Rassieur . |
| 3,396,981 | 8/1968 | Hammond . |
| 3,400,616 | 9/1968 | Mihic . |
| 3,533,638 | 10/1970 | Sedgwick . |
| 3,599,966 | 8/1971 | Holt . |
| 3,730,637 | 5/1973 | Cellini . |
| 3,758,125 | 9/1973 | Cornelia . |
| 3,788,658 | 1/1974 | Benjamin et al. . |
| 3,790,296 | 2/1974 | Mottu et al. . |
| 3,840,928 | 10/1974 | Beck et al. . |
| 3,858,910 | 1/1975 | Oetiker . |
| 4,053,248 | 10/1977 | Schultenkamper et al. . |
| 4,124,317 | 11/1978 | Dauth . |
| 4,135,418 | 1/1979 | McCray et al. . |
| 4,228,705 | 10/1980 | Heisner . |
| 4,270,422 | 6/1981 | Andersson . |
| 4,274,314 | 6/1981 | Repinski . |
| 4,274,774 | 6/1981 | Haga et al. . |
| 4,292,866 | 10/1981 | Kaczynski . |
| 4,325,664 | 4/1982 | Mori . |
| 4,361,286 | 11/1982 | Hofmann et al. . |
| 4,373,828 | 2/1983 | Sartori ........................... 403/348 X |
| 4,406,195 | 9/1983 | Kruger et al. . |
| 4,436,464 | 3/1984 | Seiberlich . |
| 4,478,541 | 10/1984 | Okada et al. . |
| 4,499,800 | 2/1985 | Stahl . |
| 4,585,380 | 4/1986 | Naito . |
| 4,655,631 | 4/1987 | Mitchell ........................ 82/36 B X |

FOREIGN PATENT DOCUMENTS

| | | |
|---|---|---|
| 1030656 | 5/1958 | Fed. Rep. of Germany . |
| 2318372 | 10/1974 | Fed. Rep. of Germany . |
| 2752697 | 11/1976 | Fed. Rep. of Germany . |
| 3038674 | 5/1982 | Fed. Rep. of Germany . |
| 703682 | 12/1979 | U.S.S.R. . |
| 460786 | 2/1937 | United Kingdom . |

OTHER PUBLICATIONS

"Block Tools: A Strong and Simple Universal System," Mach'Pro, Apr. 13, 1983.

Primary Examiner—Andrew V. Kundrat
Attorney, Agent, or Firm—Dickstein, Shapiro & Morin

[57] ABSTRACT

A quick change tool holder of the block tool type wherein a tool nose assembly is releasably secured to a drive member at an interface plane. A bayonet subassembly extends coaxially from the drive member by some predetermined distance and is receivable in an axially extending socket in the tool nose. The bayonet subassembly is selectively rotatable relative to the drive member between engaged and disengaged conditions with the tool nose socket. The distance that the bayonet subassembly extends from the drive member is selectively adjustable for insuring that the bayonet securely engages with the socket.

18 Claims, 4 Drawing Sheets

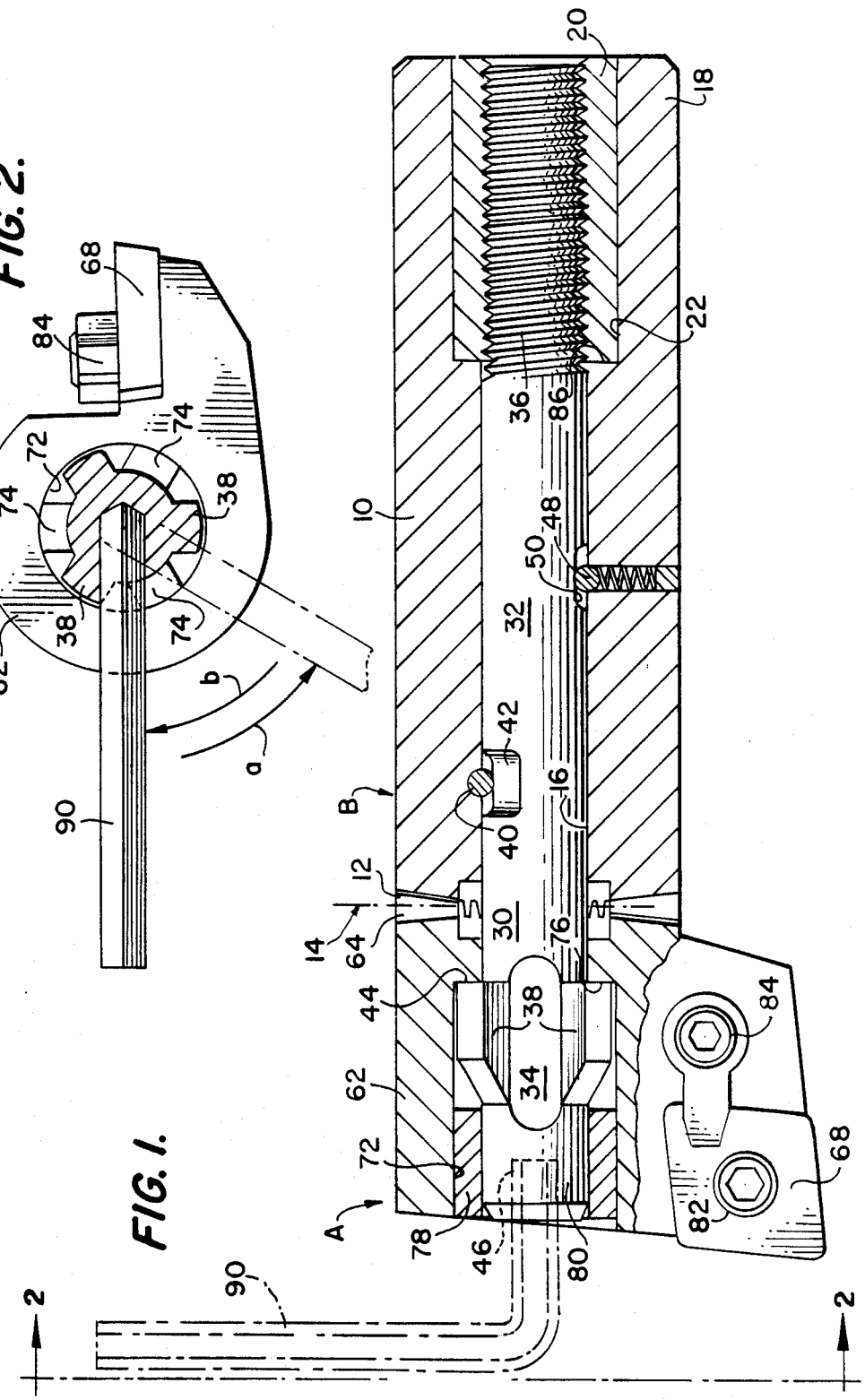

QUICK CHANGE TOOL HOLDER

This is a Continuation-in-part of application Ser. No. 669,529, filed Feb. 8, 1985, and now Pat. No. 4,665,631.

BACKGROUND OF THE INVENTION

This invention relates to the art of tool holders. The invention finds particular application in tool holder systems wherein a plurality of separate tool assemblies are interchangeably mountable to a tool holder for performing a variety of machining operations and will be described with particular reference thereto. Such systems are commonly referred to as block tools, although it will be appreciated that the invention has broader applications and may be used in other environments.

Over the years, lathe units, as well as other machining equipment, have been developed to the point where they can be left to operate on their own without continuous supervision by an operator. Such arrangements have spawned automatic tool changing systems which provide better performance than was heretofore possible. Recently, the so-called block tool concept has been developed wherein tool changeover affects only the tool nose, and not the complete tool accessory. In this type of arrangement, a tool holder is fixedly secured by conventional means in a machine tool such as a lathe or the like, and this tool holder is adapted to selectively receive and retain a wide variety of tool noses. Each tool nose, in turn, includes a particular cutting tool which accommodates the performance of a desired machining step.

Systems which employ the block tool concept are relatively new and have provided generally satisfactory operational results. However, early systems or devices of this type have had some shortcomings such as an excessive number of component parts, size, complex operations, tool nose retention difficulties, adaptability, and the like. Therefore, it has been considered desirable to develop an improved quick change tool holder device which would accommodate practice of the block tool type concept in a more efficient and effective manner while also significantly reducing the size and complexity to the tool holder device.

The subject invention is deemed to meet the foregoing needs and overcome certain disadvantages and problems encountered with prior block tool systems to provide new and improved apparatus which is more efficient, has fewer parts, and which is more reliable in use.

BRIEF DESCRIPTION OF THE INVENTION

The present invention broadly relates to coupling arrangements to facilitate selective interconnection of two members in an axially disposed relationship at an interface plane. In the preferred environments, these coupling arrangements are used in a tool holder for allowing a tool nose to be releasably secured to a drive member and wherein the drive member, in turn, is fixedly secured to a machine tool. The coupling relationship between the tool nose and drive member allows a plurality of separate tool noses to be easily secured to and removed from the drive member in a predetermined sequence to effect some desired machining results.

More particularly in accordance with the invention, the coupling is employed for connecting a pair of toothed drive members which drivingly engage each other at an interface plane. A bayonet subassembly is rotatably mounted to one of the toothed drive members such that the subassembly extends coaxially beyond the forward end of the drive member by some predetermined distance. A socket means having a predetermined depth is provided for selectively connecting the bayonet subassembly to the other toothed drive member such that the subassembly extends substantially through the center of the interface plane. Either the distance that the bayonet subassembly extends beyond the first drive member or the depth of the socket is adjustable so as to insure a solid driving interconnection between the subassembly and the socket.

According to another aspect of the invention, the bayonet subassembly is selectively releasable from the socket for allowing the toothed drive members to be axially separated.

According to still another aspect of the invention, the rotatable interconnection between the bayonet subassembly and one of the toothed drive members includes insert means for selectively adjusting the distance that the bayonet subassembly extends beyond the forward end of the one toothed drive member.

In a second embodiment, the coupling includes a locking subassembly and means for mounting the subassembly to one of the toothed members such that the locking subassembly is housed within and is accessible from the forward end of the one member. A connecting means is provided for connecting the locking subassembly to the other toothed member so that the subassembly extends substantially through the center of the interface plane. One of the mounting means and the connecting means includes biasing means for providing the primary force to effect the driving engagement between the toothed members at the interface plane.

In accordance with a further aspect of the invention, one of the mounting means and the connecting means is selectively releasable for allowing the toothed members to be axially separated.

In accordance with yet another aspect of the invention, the coupling arrangement includes means for selectively overcoming the force of the biasing means. In the preferred construction, the biasing means comprises spring washers which may be selectively compressed and expanded to effect released and locked conditions of the locking subassembly.

A primary advantage of the subject invention is the provision of a coupling arrangement for securely interconnecting a pair of cooperable members in an end-to-end relationship with each other.

Another advantage of the invention resides in providing a coupling arrangement for tool holders which increases the adaptability thereof.

Still another advantage of the invention is found in reducing the cost of interchangeable tool holders.

Yet a further advantage of the invention is an interchangeable tool drive having increased strength.

Other advantages and benefits of the invention will become apparent to those skilled in the art upon a reading and understanding of the following detailed specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 1 is a longitudinal, substantially cross-sectional view of a tool holder assembly incorporating the bayonet subassembly concept of the subject invention with the device shown in an engaged position;

FIG. 2 is an end view of the tool holder assembly taken generally along lines 2—2 of FIG. 1 with the bushing at the outer end of the tool nose removed for ease of illustration;

DETAILED DESCRIPTION OF THE PREFERRED EMBODIMENT

Figure 3:
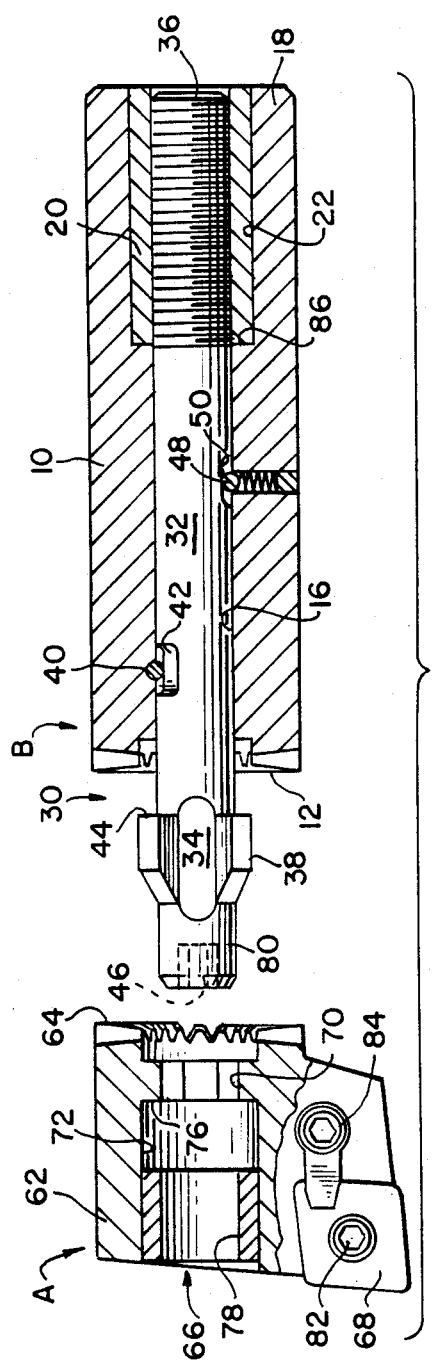
FIG. 3 is a view similar to FIG. 1 with the tool holder assembly in a disengaged and separated condition.
Figure 4:
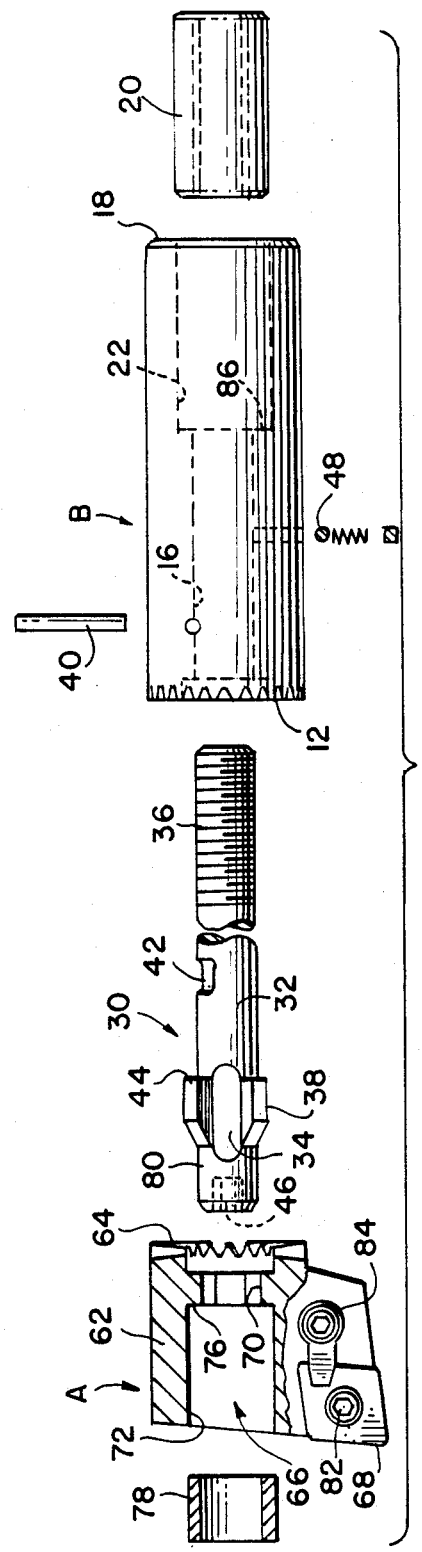
FIG. 4 is an exploded view of the tool holder assembly in partial cross-section.

Referring now to the drawings wherein the showings are for purposes of illustrating preferred and alternative embodiments of the invention only and not for purposes of limiting same, FIGS. 1, 3, and 4 show a bayonet subassembly coupling arrangement for selectively coupling an interchangeable tool nose A with a universal drive member B. The universal drive member includes a cylindrical body or shank 10 having an integral, forwardly facing drive face 12. The drive member is made of steel, and shank 10 is adapted for chucking in a turning machine (not shown) by conventional means for connecting the universal drive member B to a driving force. The universal drive member may be adapted to use with any machine which can accept the shank 10.

Drive face 12 includes an array of drive elements disposed outwardly of the longitudinal axis of shank 10 and adapted to be placed in driving engagement with compatible drive elements or formations on tool nose A in a manner to be described. In the embodiment under consideration, the drive elements comprise circular arrays of drive teeth formed on the shank 10 and the tool nose A in the manner shown. It will be appreciated, however, that alternative drive elements may be advantageously employed without in any way departing from the inventive concept involved. Drive face 12 forms part of an interface plane 14, and a bore 16 extends coaxially through the shank between the drive face and the opposite end face 18. A portion of bore 16 is defined by an internally threaded insert 20 which is selectively secured in an enlarged bore section 22 adjacent shank end face 18. The mode of fixedly connecting the insert in the enlarged bore will be described below.

A bayonet subassembly 30 comprises the main interconnect member for the device. This bayonet subassembly is comprised of a single diameter rod 32 having a multi-pronged bayonet 34 on one end and threads 36 on the other. Preferably, the bayonet subassembly is constructed of steel. As shown in FIG. 2, the three prongs 38 are equidistantly spaced around the bayonet circumference, although a greater or lesser number of prongs could also be satisfactorily employed. The bayonet subassembly is rotatably mounted in bore 16 of shank 10 such that bayonet 34 extends from the forward end of the shank and threads 36 engage corresponding internal threads of insert 20. Bayonet subassembly 30 is selectively rotatable between predetermined first and second rotary positions with respect to shank 10.

A pin 40 in the shank cooperatively connects with a circumferentially extending detent stop 42 in rod 32 to prevent rotation of the bayonet subassembly beyond the first and second rotary positions. Due to the threaded interconnection between bayonet subassembly 30 and insert 20, rotation of the bayonet subassembly between the first and second rotary positions also moves the shoulders 44 of the bayonet axially of the shank toward and away from drive face 12. This rotation-axial movement of the bayonet subassembly accomplishes the main coupling of the tool nose to the drive member in a manner to be described.

In the device shown, an Allen drive fitting 46 is included at the end of the bayonet 34 to provide means for rotating the bayonet subassembly between the first and second rotated positions. A spring loaded ball 48 housed in shank 10 cooperates with a longitudinally extending detent 50 in rod 32 for releasably retaining the bayonet subassembly in the second rotary position for reasons and purposes to be described.

With particular reference to FIGS. 3 and 4, the interchangeable tool nose A comprises the tool holder for the device. The tool nose includes a generally cylindrical body section 62, a drive face 64, a through passageway 66, and a cutting tool 68. The tool nose itself is preferably constructed of steel. Body section 62 is substantially the same diameter as body or shank 10 of the drive member, and drive face 64 is integrally formed with the body section. The drive face includes a circular array of radial drive teeth disposed about the body section longitudinal axis, and these teeth are adapted to be placed in driving engagement with the compatible teeth on drive face 12. Drive face 64 forms the other part of interface plane 14 (FIG. 1) between drive member B and tool nose A.

Through passageway 66 includes a centrally located, axially extending socket 70 extending from drive face 64 and communicating with an enlarged opening 72 extending axially into body section 62 from the forwardmost end thereof. As shown in FIG. 2, socket 70 has three equidistantly spaced apart radial grooves 74 for accommodating axial passage of the three bayonet prongs 38 therethrough. Socket 70 forms an outward lip or shoulder 76 at the area of communication with opening 72, and this lip is located a predetermined distance from interface plane 14. A bushing 78 is employed to reduce the diameter of opening 72 and closely receive end 80 of the bayonet subassembly. This bushing further stabilizes tool nose A with respect to drive member B by increasing the extent of axial contact and support between the tool nose and bayonet 34.

Cutting tool 68 as shown comprises a four-sided parallelogram-shaped carbide insert. This tool is removably secured to the tool nose by convenient means such as a screw 82 and a stop 84. Other tool shapes and sizes, and other securing means can also be satisfactorily utilized with the subject invention.

Ideally, the distance between lip 76 and drive face 64 or interface plane 14, hereinafter referred to as the socket lip distance, and the minimum distance between shoulder 44 and drive face 12 or interface plane 14, hereinafter referred to as the bayonet shoulder distance, are equal. Engagement of shoulder 44 of the bayonet with lip 76 of the socket couples the tool nose A to the drive member B. To control these distances, the tool noses and drive members go through the following procedures during manufacture thereof.

Each tool nose A is initially made with the distance between lip 76 and the drive face 64, ie., the socket lip distance, greater than the ultimate designed distance. During final machining of the tool nose, the socket lip distance is taken to its ultimate designed distance. In order to insure interchangeability, each tool nose of a tool nose series which is to be used with a certain series of drive members is taken to the same designed distance.

Due to the presence of threaded insert 20, the finish manufacture of every drive member B is made easier. The distance between shoulder 44 and drive face 12, ie., the bayonet shoulder distance, is not adjusted by a machining process. This distance is, instead, adjusted by rotation of insert 20 in a process now to be described. The first step of the process comprises the finish machining of body or shank 10. This includes the machining of drive face 12, bore 16, and the radial holes for pin 40 and spring loaded ball 48. The second step is the insertion of bayonet subassembly 30 axially into bore 16 of body or shank 10 until circumferentially extending detent 42 is aligned with the hole for pin 40. This alignment can only occur when the bayonet subassembly is substantially in its final position with respect to shank 10.

Pin 40 and spring loaded ball 48 are then installed in the shank. Because the ball is spring loaded, it is not necessary that it line up with longitudinally extending detent 50 at this time. Pin 40 and detent 42 are designed so as to provide physical stops for the first and second rotary positions of bayonet subassembly 30 with respect to shank 10, while also accommodating some axial adjustment between the bayonet subassembly and shank.

At this time, insert 20 is threaded onto the threads 36 of the bayonet rod 32 and rotated or advanced thereon. Advancement of the insert onto the rod eventually will cause the insert to pull axially into enlarged bore section 22 and bottom against an inner wall 86 thereof. Since insert 20 is now bottomed against this wall, any further rotation of the insert will cause bayonet subassembly 30 to move axially of shank 10. The insert is rotated further to move the bayonet subassembly axially until pin 40 is substantially in the center of detent 42. Rotation of the insert is then stopped, and the bayonet subassembly rotated into its second position with respect to shank 10. At this time, spring loaded ball 48 will engage detent 50 to retain the bayonet subassembly in this second position. The spring loaded ball and the associated detent are designed to releasably retain the bayonet subassembly in the second position while allowing for some axial adjustment between the bayonet subassembly and shank.

The distance between shoulder 44 and drive face 12, the bayonet shoulder distance, is then measured. This distance should be substantially equal to or slightly less than the distance between lip 76 and drive face 64, the socket lip distance, of the tool nose series that will be interchangeably utilized with drive member B. If the measured bayonet shoulder distance is greater than the socket lip distance, insert 20 is advanced further into rod 32. Since the insert is bottomed against the wall 86, continued rotation of the insert will cause bayonet subassembly 30 to move axially of shank 10 in a manner to reduce the bayonet shoulder distance. If the measured bayonet shoulder distance is less than the socket lip distance, the insert is retracted on rod 32, ie., rotated in the opposite direction, with the insert remaining bottomed against wall 86. This retracting of the insert will cause bayonet subassembly 30 to move axially of shank 10 in a manner to increase the bayonet shoulder distance.

As soon as the measured bayonet shoulder distance substantially equals the socket lip distance, all rotation of insert 20 is terminated, and the insert is fixedly secured to the shank. This is preferably achieved by spot welding the insert to the shank at end face 18, although any other convenient method of connection that prevents relative rotation between the insert and shank could also be satisfactorily employed. If releasable connecting means was used, the bayonet shoulder distance could be readjusted from time to time as necessary to compensate for wear, allow use of the drive member with a series of tool noses having a different socket lip distance, etc.

In order to operatively connect tool nose A with drive member B, and with principal reference to FIGS. 1 and 2, an operator inserts an Allen wrench 90 into drive fitting 46 at the end of bayonet 34 and applies force in direction a, ie., toward the first rotary position with respect to shank 10. At first, the spring loaded ball 48—detent 50 combination resists rotation of bayonet subassembly 30. Eventually, the rotary force on the wrench 90 overcomes the resistance and rotates the bayonet subassembly the approximately 60° into its first rotary position with respect to shank 10. Due to the threaded interconnection between the rod threads 36 and insert 20, this rotation of the bayonet subassembly to its first rotary position also moves the subassembly axially of the shank to increase the bayonet shoulder distance.

After insuring that the bayonet subassembly is in its first rotary position, the operator removes wrench 90. In this first rotary position of the bayonet subassembly, the operator can locate socket 70 of the tool nose over the bayonet 34 of drive member A. When properly aligned, grooves 74 of the socket can be passed about prongs 38 of the bayonet, and drive face 64 of the tool nose will engage with drive face 12 of the drive member.

While holding the tool nose A in the above-described location, the operator inserts wrench 90 through enlarged opening 72 in the end of the tool nose into drive fitting 46 at the end of bayonet 34. The operator then rotates bayonet subassembly 30 approximately 60° in direction b from its first rotary position to its second rotary position with respect to shank 10. In the second rotary position of the bayonet subassembly, spring loaded ball 48 again engages the detent 50 in rod 32.

Due to the threaded interconnection between rod 32 of the bayonet subassembly and insert 20, such rotation has the effect of moving the bayonet subassembly axially of shank 10 to reduce the bayonet shoulder distance so that it is substantially equal to the socket lip distance. This rotational and axial movement of the bayonet subassembly causes shoulder 44 of bayonet 34 to engage lip 76 of socket 70 and forcibly draw drive faces 12, 64 into close mating engagement with each other. Such engagement couples tool nose A to drive member B.

Once connected in the manner described, no external force is required to maintain the tool nose in driving engagement with the drive member, and these two components will act and function as a single, unitary member. The spring loaded ball 48—detent 50 combination insures that the bayonet subassembly will not inadvertently rotate from its engaged second position due to any incidental forces on or between the tool nose and the drive member, and only a positive force of the subassembly will cause such movement. To remove the tool nose from a mounted relationship with the drive member, the foregoing assembly process is merely reversed.

If desired, the rotary motion of bayonet subassembly 30 could be accomplished by a motor within shank 10 or external to drive member B instead of the Allen wrench 90. For example, a motor driven hex key could be provided within the shank or at every tool nose stand such that the machine to which a drive member and particular tool nose combination are connected could automatically go to an empty tool nose stand, disengage bayonet subassembly 30 from the particular tool nose, go to a full tool nose stand, and engage a new tool nose. This modification would allow for complete unattended automation of the tool change process. Such a modification would not depart from the basic bayonet subassembly coupling concept of this invention. In an alternate embodiment, an insert could be utilized to adjust the socket lip distance instead of or in addition to adjusting the bayonet shoulder distance.

The preferred and alternate embodiments of the bayonet subassembly concept are simple, small, strong, and adaptable. The bayonet subassembly concept is simple because its engagement-disengagement occurs in a device with only one moving part, and a total of only three major components. The bayonet subassembly concept is small because the single moving component comprises a unitary rod which is under tension in the engaged position of the device. Due to this type of loading, the rod can be of a relatively small diameter, thus, in turn, allowing the diameter of the overall device to be reduced to a minimum.

The bayonet subassembly concept is strong because its three major parts are each formed of unitary machined steel, and the drive teeth are oversized with respect to the diameter of the total device. The bayonet subassembly concept is adaptable because, due to the small size of the device, many more tools can now use interchangeable tool nose drive members. In addition, because of the adjustability of the distances within the device, a single drive member can be used with a multiplicity of tool noses.

FIGS. 5-9 show an alternative embodiment which incorporates a biasing means and is employed for selectively connecting an interchangeable tool nose C with a universal drive member D.

More particularly, the universal drive member includes a generally cylindrical rear shank 110, an enlarged diameter generally cylindrical interconnect section 112, and a drive face 114 which is compatible with the interconnect section. Shank 110 is for chucking in a turning machine (not shown) by conventional means to connect universal drive member D to a driving force for the tool. The universal drive member can be readily adapted to use with any machine which accepts shank 110. Drive face 114 is fixedly connected to the forward end of interconnect section 112 by suitable threaded fasteners 116. The drive face has an axial opening 118 extending therethrough and communicating with an internal cavity 120 extending axially into interconnect section 112. A releasable coupling mechanism 122, in turn, is housed within cavity 120.

Figure 6:
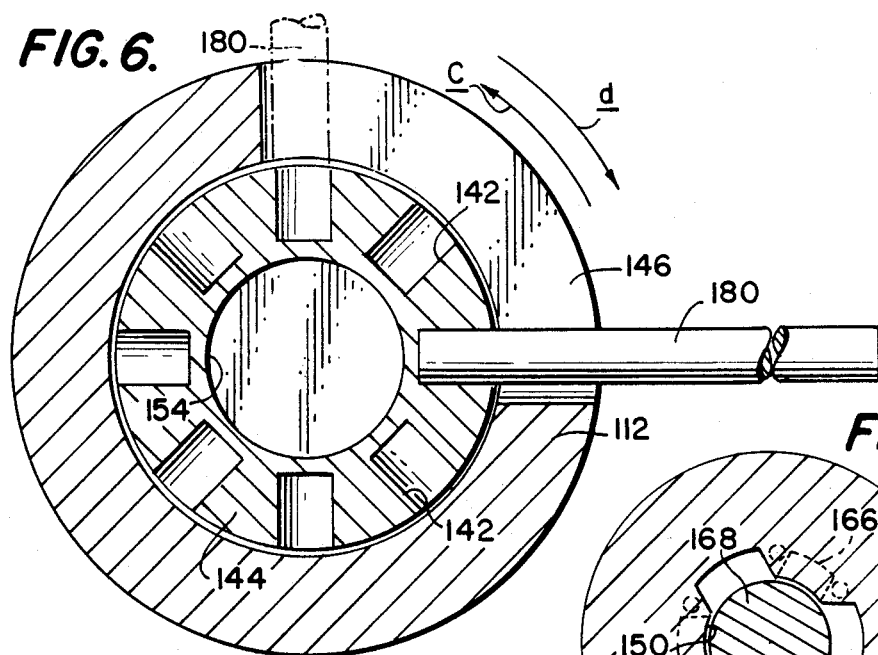
FIG. 6 is a cross-sectional view taken generally along lines 6—6 of FIG. 5.

Coupling mechanism 122 includes a push ring member 132, a lock ring 134, and a series of Belleville spring washers 136. Push ring member 132 has a reduced diameter end 138 threaded for interconnection with a threaded nut 140 which is fixedly secured to cavity 120 adjacent the inner end thereof. As best shown in FIGURE 6, push ring member 132 includes a series of equally spaced, radially extending holes 142 in a major diameter portion 144 thereof. A circumferential slot 146 in interconnect section 112 of universal drive member B facilitates access to radial holes 142 for reasons and purposes to be described. As shown, however, slot 146 extends over approximately 90° of the circumference of the interconnection section, and the width of the slot is significantly greater than the diameter of holes 142.

Figure 5:
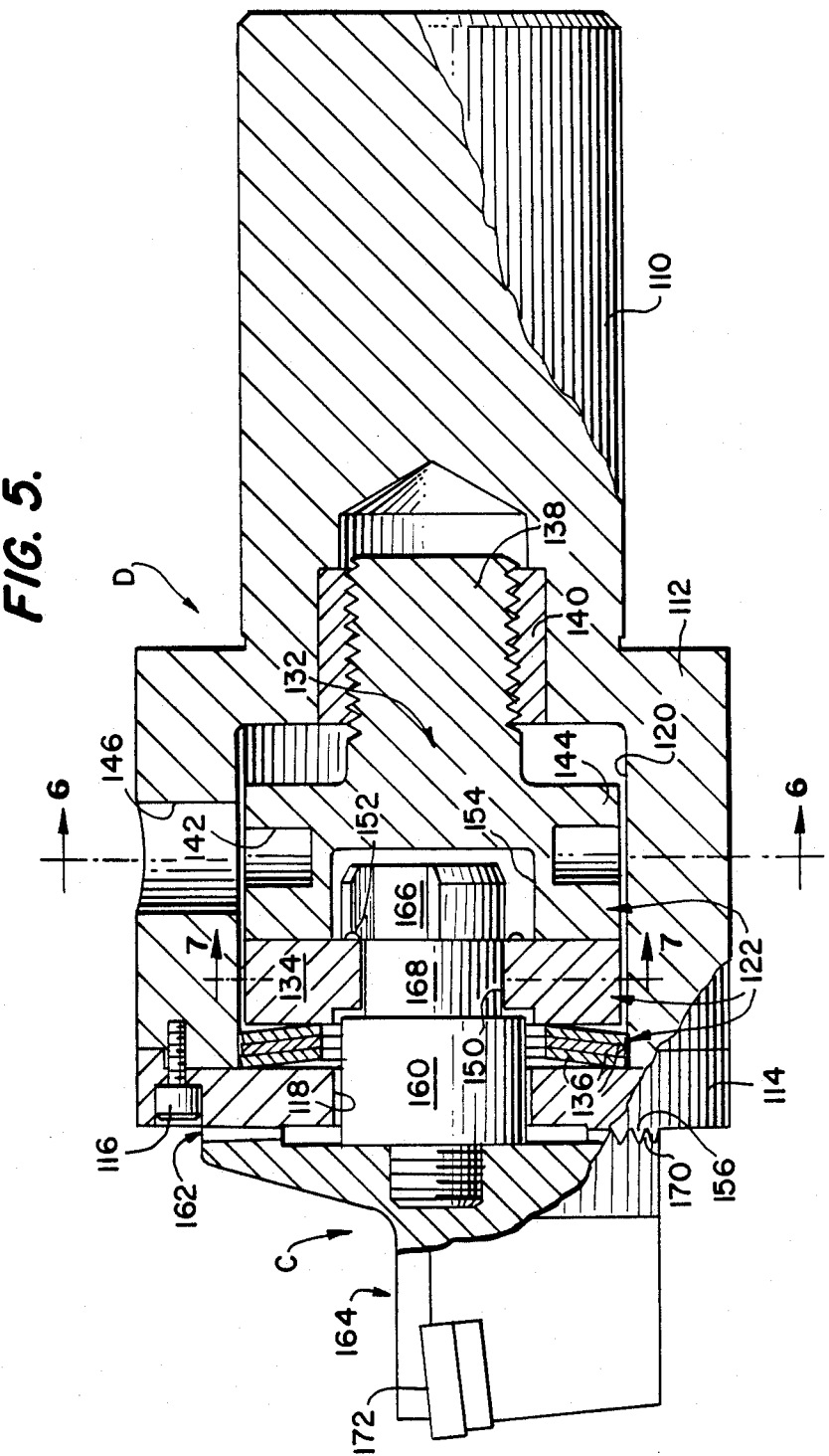
FIG. 5 is a side elevational view in partial cross-section of a tool holder assembly incorporating a biasing means in accordance with the invention.
Figure 7:
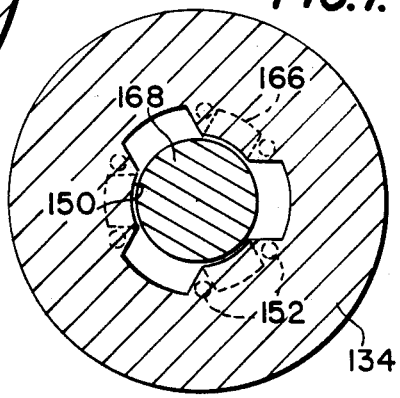
FIG. 7 is a cross-sectional view taken generally along lines 7—7 of FIG. 5.

Major diameter portion 144 of the push ring member is disposed adjacent to lock ring 134. This lock ring is comprised of a solid piece of steel and includes a central bayonet slot opening 150 as shown in FIGURE 7. As shown, opening 150 has three equidistantly spaced apart radial grooves, although a greater or lesser number, or a different conformation for these grooves, could also be satisfactorily employed. The planar inner surface or face of lock ring 134 which surrounds bayonet opening 150 is dimpled as by, for example, raised portions 152 (FIGS. 5 and 7). For reasons to be described, these raised portions are provided in pairs, with the raised portions comprising each pair being located adjacent opposite sides of an associated groove in opening 150. The raised portions are received within a cavity 154 provided in the forward face of push ring member 132 so as to not interfere with a face-to-face engaging relationship between the push ring member and lock ring 134.

Belleville spring washers 136 are interposed between the forward face of lock ring 134 and the drive face 114. The Belleville spring washers normally bias the lock ring 134 away from the drive face with a force of approximately 2,000 pounds in the preferred construction. While three such spring washers are shown in the drawings, it is to be appreciated that a greater or lesser number of these springs could be suitably employed. The outer surface or face of the drive face 114 includes a circular array of drive teeth 156 coaxial with opening 118 and adapted to be placed in driving engagement with compatible teeth on interchangeable tool nose C.

Figure 8:
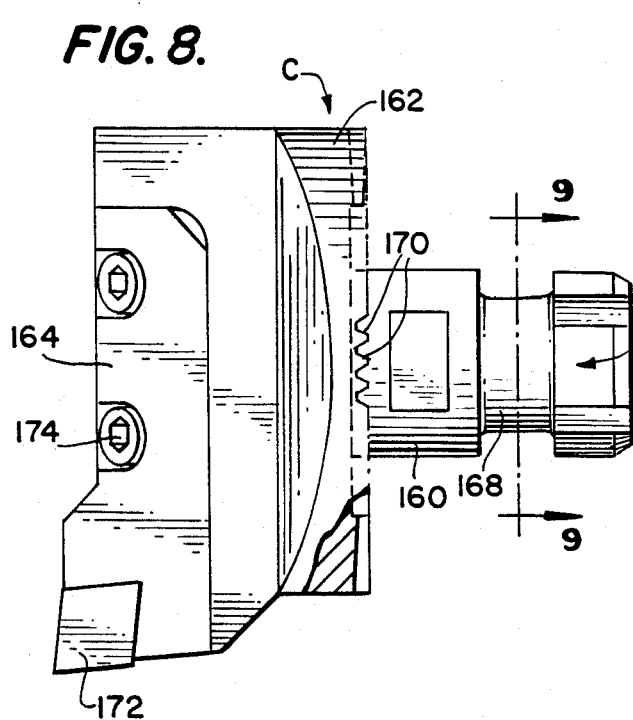
FIG. 8 is a side elevational view of the tool nose rotated approximately 90°0 from the position shown in FIG. 5; and, FIG. 9 is a cross-sectional view taken generally along lines 9—9 of FIG. 8.
Figure 9:
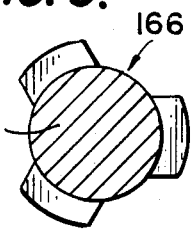

With particular reference to FIG. 8, interchangeable tool nose C generally includes a bayonet 160, a drive face 162, and a cutting tool 164. Bayonet 160 extends rearwardly from drive face 162, having a three-pronged head 166 (FIG. 9) and a reduced diameter neck 168. The radial prongs on head 168 are dimensioned and configured so that they may be inserted through bayonet slot opening 150 in lock ring 134. Drive face 162 has teeth 170 arranged and configured to matingly confront drive teeth 156 of universal drive member D.

As shown, cutting tool 164 includes a hardened tip or cutting insert 172. The cutting tool is secured to tool nose C by conventional threaded fastening means 174. It is to be appreciated, however, that other tools and tool mountings may be advantageously employed without in any way departing from the overall intent or scope of the invention.

In order to connect tool nose C to universal drive member D, and with principal reference to FIGURES 5 and 6, an operator inserts a rod-like tool 180 through circumferential slot 146 in the enlarged diameter interconnect section 112 to engage one of radially extending holes 142 in push ring 132 (FIG. 6). The operator then rotates the push ring by means of tool 180 in direction c for right-hand threads the roughly 90° allowed by the end walls of the circumferential slot 146. Because of the threaded connection between the reduced diameter end 138 of push ring member 132 and nut 140 which is fixedly secured in cavity 120, such rotation causes the push ring to be moved axially of the cavity to bear against lock ring 134. This axial movement is, in turn, transferred through the lock ring to begin compression of Belleville spring washers 136. After each 90° of rotation, the operator removes tool 180 from the particular hole 142 then engaged, and engages it in a new hole 142 accessible at the initial end of the slot. Such further rotation of push ring member 132 with the corresponding axial movement increases the compression of Belleville spring washers 136.

After a number of successive rotations of the push ring, the Belleville spring washers will have been compressed sufficiently so that the operator can insert bayonet 160 of interchangeable tool nose C through opening 118 in drive face 114. When properly aligned, pronged head 166 of the bayonet is passed through bayonet slot opening 150 in lock ring 134 and is freely received in cavity 154, and the components are axially positioned so that teeth 170 of tool nose C will mesh with teeth 156 on universal drive member D. The operator then rotates the tool nose approximately 60° in either direction to position the prongs of bayonet head 166 intermediate adjacent ones of dimples or raised portions 152 on the rear face of lock ring 134 to thus seat the bayonet.

While holding the tool nose C in the above-described located position, the operator again inserts tool 180 through circumferential slot 146 to engage one of the radially extending holes 142 in push ring 132 to rotate the push ring in direction d (FIGURE 6). Such rotation has the effect of moving the push ring 132 axially inward into drive member D. This inward movement decompresses the Belleville spring washers so that lock ring 134 and joined tool nose C are similarly moved further into or toward drive member D.

After a number of rotations of the push ring, teeth 170 of tool nose 110 will engage teeth 156 of the universal drive member. With a few more rotations of the push ring, it will no longer bear on lock ring 134. Rather, the full force of Belleville spring washers 136 will act through the lock ring 134 and bayonet 160 to cause engagement between teeth 170, 156. At this point, push ring 132 need not be rotated any further. Once connected in the manner described, no external force is necessary in order to maintain fixed engagement of tool nose C to drive member D, and these components will function as a single unitary unit. To remove the tool nose from the universal drive member, it is merely necessary to reverse the interconnection process.

If desired, the compression-decompression of Belleville spring washers 136 could be accomplished with a motor within shank 110 or external to the drive member with equal effect to that of rod-like tool 180. Such modification does not, however, depart from the basic inventive concept here involved.

In an alternate arrangement, push ring member 132 and lock ring 134 would be connected together by pins for common rotation, and the pitch of the threads between push ring member 132 and nut 140 would be such that it would take only a very limited rotation of the push ring to sufficiently compress the Belleville spring washers to disengage the force urging mating engagement between teeth 170, 156. In this construction, the operator would not have to rotate tool nose C relative to universal drive member D to engage-disengage the bayonet 160 to the lock ring 134. Rather, this engagement-disengagement would occur automatically with rotation of push ring 132 because of the connected relationship between the push ring member and lock ring.

As an extension of this possible alternative, push ring member 132 and lock ring 134 would be constructed as a single component, and raised portions 152 on the rear face of the lock ring would be replaced with a series of inclined ramps. Rotation of the unitary push ring-lock ring component would cause the prongs on head 166 of bayonet 160 to engage these inclined ramps. Due to the ramps, a 90° rotation of the unitary push ring-lock ring component would compress the Belleville spring washers and cause engagement of the bayonet at a locking stop. Further or reverse rotation of the unitary push ring-lock ring would decompress the Belleville spring washers and disengage the bayonet.

The preferred and alternate embodiments of the biasing means concept are, again, simple, small, strong, and adaptable. That is, the embodiments contain a minimum number of components, all of which are functional. The embodiments are strong because the basic components are constructed from solid steel and a uniform 2,000 pound force is realized for connecting the tool nose to the drive member. The embodiments are adaptable because they are self-contained. The drive member and tool nose by themselves incorporate all of the parts necessary to make them interchangeable. The system can, therefore, be used with any machine that will accept shank 110 of the drive member with no special modifications being necessary to the machine. In addition, because the interconnection is mechanically spring loaded, a loss of power will not cause or occasion an inadvertent disconnection of the tool nose from the drive member.

While the invention has been described with reference to preferred and alternative constructions for use with a turning machine, the invention is readily adapted to use wherever an interchangeable tool nose is to be connected to a tool holder, whether rotating or non-rotating. Various modifications of the invention disclosed will occur to others upon a reading and understanding of this specification. It is intended to include all such modifications insofar as they come within the scope of the appended claims or the equivalents thereof.

Having thus described the invention, it is now claimed:

1. A tool holder assembly comprising a mounting shank member and a tool nose member said shank member and said nose member comprising cooperating teeth elements, and connecting means for releasably maintaining said shank member and said nose member drivingly engaged at an interface plane, said connecting means comprising: a bayonet subassembly, first means for attaching said bayonet subassembly to said shank so as to extend a first distance from interface plane, second means for selectively attaching said bayonet subassembly to tool nose members a second distance from the interface plane with said bayonet subassembly extending through said interface plane, said first and second distances preferably being generally equal to each other, and first attaching means comprising adjustment means for adjusting the associated said first distance for substantially equalizing said first distance with the said second distance.

2. A tool holder assembly comprising a mounting shank member and a tool nose member comprising means for releasably mounting a cutting element therein, said shank member and said nose member comprising cooperating drive elements, and connecting means for releasably maintaining said shank member and said nose member drivingly engaged at an interface plane, said connecting means comprising: a bayonet subassembly, first means for attaching said bayonet subassembly to one of said shank and tool nose members so as to extend a first distance from said interface plane, second means for selectively attaching said bayonet subassembly to the other of said shank and tool nose members a second distance from the interface plane with said bayonet subassembly extending through said interface plane, said first and second distances preferably being generally equal to each other, and one of said first and second attaching means including adjustment means for adjusting the associated one of said first and second distances for substantially equalizing said one distance with the other distance, and one of said first and second attaching means includes means for securing said one distance in an adjusted state.

3. The tool holder assembly as defined in claim 1 wherein said adjustment means comprises an insert mounted between said bayonet and said shank member.

4. The tool holder assembly as defined in claim 1 wherein said adjustment means mounted between said bayonet subassembly and said shank adjusts said first attaching means.

5. The tool holder assembly as defined in claim 1 wherein said second attaching means comprises a movable member movable between disengaged and engaged positions and wherein said first and second distances are substantially equal only in the engaged position of said movable member.

6. The tool holder assembly as defined in claim 5 wherein said shank member is cylindrical and said movable member moves axially of said shank to substantially equalize said first and said second distances in engaged and disengaged positions.

7. The tool holder assembly as defined in claim 1 wherein first attaching means secures said bayonet subassembly to said mounting shank and said adjustment means is cooperable with said bayonet subassembly for allowing selective adjustment of said first distance.

8. A tool holder assembly comprising a mounting shank member and a tool nose member including means for releasably mounting a cutting element therein, said shank member and said nose member including cooperating drive elements, and connecting means for releasably maintaining said shank member and said nose member drivingly engaged at an interface plane, said connecting means comprising: a bayonet subassembly, first means for attaching said bayonet subassembly to one of said shank and tool nose members so as to extend a first distance from said interface plane, and said first attaching means secures said bayonet subassembly to said mounting shank, second means for selectively attaching said bayonet subassembly to the other of said shank and tool nose members a second distance from the interface plane with said bayonet subassembly extending through said interface plane, said first and second distances preferably being generally equal to each other, and one of said first and second attaching means including adjustment means for adjusting the associated one of said first and second distances for substantially equalizing said one distance with the other distance, said adjustment means comprises a threaded interconnection between said bayonet subassembly and said mounting shank, whereby said first distance may be varied in response to selective rotation of said bayonet subassembly, and said adjustment means is cooperable with said bayonet subassembly for allowing selective adjustment of said first distance.

9. The tool holder assembly as defined in claim 1 wherein said cooperating drive elements comprise interfitting tooth-like elements on each of said mounting shank and tool nose members.

10. A tool holder assembly comprising a mounting shank member and a tool nose member comprising means for releasably mounting a cutting element therein, said shank member and said nose member comprising cooperative drive elements, and connecting means for releasably maintaining said shank member and said nose member drivingly engaged at an interface plane, said connecting means comprising: a bayonet subassembly, first means for attaching said bayonet subassembly to one of said shank and tool nose members so as to extend a first distance from said interface plane, second means for selectively attaching said bayonet subassembly to the other of said shank and tool nose members a second distance from the interface plane with said bayonet subassembly extending through said interface plane, said first and second distances preferably being generally equal to each other, and one of said first and second attaching means including adjustment means for adjusting the associated one of said first and second distances for substantially equalizing said one distance with the other distance, and where said bayonet subassembly includes a bayonet portion having a rod portion extending rearwardly therefrom connected to said mounting shank by said first attaching means such that said bayonet portion is spaced from a forward end face of said mounting shank by said first distance, said adjusting means allowing variation of said first distance in response to selective rotation of said bayonet subassembly relative to said mounting shank.

11. The tool holder assembly as defined in claim 1 wherein said bayonet subassembly is releasably secured to said tool nose by said second attaching means.

12. The tool holder assembly as defined in claim 11 wherein said bayonet subassembly comprises a bayonet portion and said tool nose comprises a bayonet portion receiving socket, one of said bayonet portion and receiving socket being selectively shiftable relative to the other between disengaged and engaged positions, said adjustment means causing said first and second distances to be substantially equal only in said engaged position.

13. A tool holder assembly comprising a mounting shank member and a tool nose member including means for releasably mounting a cutting element therein, said shank member and said nose member including cooperating drive elements, and connecting means for releasably maintaining said shank member and said nose member drivingly engaged at an interface plane, said connecting means including: a bayonet subassembly said bayonet subassembly releasably secured to said tool nose by a first attaching means such that said bayonet subassembly extends a first distance from said interface plane, said bayonet subassembly comprises a bayonet portion and said tool nose includes a bayonet portion receiving socket, one of said bayonet portion and receiving socket being selectively shiftable relative to the other between disengaged and engaged positions, a second attaching means for selectively attaching said bayonet subassembly to said shank a second distance from the interface plane with said bayonet subassembly extending through said interface plane, said first and second distances preferably being generally equal to each other, and one of said first and second attaching means including adjustment means comprising a threaded interconnection between said bayonet subassembly and said mounting shank, whereby said bayonet portion is selectively rotatable relative to said receiving socket between said disengaged and engaged positions, and said adjustment means causing said first and second distances to be substantially equal only in said engaged position.

14. A coupling for physically connecting a pair of drive members which are drivingly engaged at an interface plane, said coupling comprising: a bayonet subassembly, an insert, means for rotatably affixing said bayonet subassembly to said insert with said bayonet subassembly being rotatable to and from a first rotary position relative to said insert, first means for adjustably connecting said insert to one of the pair of drive members with said bayonet subassembly disposed adjacent a forward end of said one drive member, said bayonet subassembly extending a first distance from the interface plane in said first rotary position, and second means for selectively connecting said bayonet subassembly to the other of the pair of drive members a second distance from the interface plane with said bayonet subassembly extending through the interface plane, said first distance preferably being generally equal to said second distance, and said first connecting means providing for adjustment of said first distance to a condition which is substantially equal to said second distance.

15. The coupling as defined in claim 14 further comprising means for fixedly attaching said insert to said one drive member following adjustment of said first connecting means, said attaching means locking in the adjustment of said first distance.

16. The coupling as defined in claim 15 wherein said means for rotatably affixing comprises a threaded interconnection for causing the distance that said bayonet subassembly extends from said interface plane to vary in response to rotation of said bayonet subassembly.

17. A coupling for releasably connecting a pair of drive members which are drivingly engaged at an interface plane by cooperating drive elements, said coupling comprising: a bayonet subassembly having a bayonet, means for rotatably connecting said bayonet subassembly to one of the pair of drive members in a generally coaxial relationship therewith with said bayonet extending from the forward end thereof, said bayonet subassembly being selectively rotatable between first and second positions, the other of said pair of drive members having a socket comprising a locking lip spaced a first distance from said interface plane extending coaxially thereinto from a forward end thereof for receiving said bayonet and wherein selective rotation of said bayonet subassembly causes said bayonet to be engaged and disengaged with said socket, the first rotated position of said bayonet subassembly causing said bayonet to be engaged with said socket for coupling said pair of drive members in driving engagement with each other at said drive elements and the second rotated position of said bayonet subassembly causing said bayonet to be disengaged from said socket for uncoupling said drive members and said bayonet subassembly is adjustable with respect to said one drive member so as to adjust the third distance and said bayonet includes a shoulder for locking engagement with said lip wherein rotation of said bayonet subassembly moving said shoulder between a second distance from said interface plane greater than said first distance in the second position of said bayonet subassembly and a third distance substantially equal to said first distance in the first position of said bayonet subassembly.

18. A coupling for releasably connecting a pair of drive members which are drivingly engaged at an interface plane by cooperating drive elements, said coupling comprising: a bayonet subassembly having a bayonet, means for rotatably connecting said bayonet subassembly to one of the pair of drive members in a generally coaxial relationship therewith with said bayonet extending from the forward end thereof, said connecting means comprising an insert, means for rotatably attaching said bayonet subassembly to said insert, means for selectively moving said insert with respect to said one drive member, and means for selectively securing said insert to said one drive member in fixed relation thereto, movement between said insert and one drive member occasioning adjustment of said third distance with said means for selectively securing locking in said third distance, said bayonet subassembly being selectively rotatable between first and second positions, the other of said pair of drive members having a socket comprising a locking lip spaced a first distance from said interface plane extending coaxially thereinto from a forward end thereof for receiving said bayonet and wherein selective rotation of said bayonet subassembly causes said bayonet to be engaged and disengaged with said socket, the first rotated position of said bayonet subassembly causing said bayonet to be engaged with said socket for coupling said pair of drive members in driving engagement with each other at said drive elements and the second rotated position of said bayonet subassembly causing said bayonet to be disengaged from said socket for uncoupling said drive members, and said bayonet subassembly is adjustable with respect to said one drive member so as to adjust a third distance and wherein rotation of said bayonet subassembly moving said shoulder between a second distance from said interface plane greater than said first distance in the second position of said bayonet subassembly and said third distance substantially equal to said first distance in the first position of said bayonet subassembly.

* * * * *